2,837,483
Patented June 3, 1958

2,837,483

METHOD OF MAKING A PERMANENT MAGNET

Petrus Johannes Hakker and Gerard Hugo Weber, Eindhoven, Netherlands, assignors, by mesne assignments, to North American Philips Company, Inc., New York, N. Y., a corporation of Delaware No Drawing. Application April 18, 1955
Serial No. 502,237

Claims priority, application Netherlands April 20, 1954

5 Claims. (Cl. 252—62.5)

Our invention relates to a method of making permanent magnets and in particular to permanent antisotropic magnets.

Specifically our invention relates to the manufacture of permanent magnets which are constituted principally by hexagonal crystals having dimensions whose size approach that of the Weiss domains in the material, i. e. dimensions less than 10 $\mu$, and which have a composition $MO.6Fe_2O_3$, M being at least one of the metals of the group consisting of barium, strontium, and lead, with up to 40% by weight of said latter elements being replaceable by calcium.

In comparison with steel-alloy magnets which contain cobalt and nickel, the aforesaid magnets have a comparatively low remanence. Since the remanence of the magnet is directly related to its density, such magnets generally have a density of more than 4 and preferably between 4.6 and 5.0 which is most conductive to a permanent magnet of high density and high coercivity.

Another factor of importance in determining the quality of a permanent magnet is the $(BH)_{max}$ value or energy product of the magnet. Isotropic magnets of the aforesaid type generally have a $(BH)_{max}$ value not exceeding $1.1 \times 10^6$ gauss-oersted. Anistropic magnets of the aforesaid type can be made by orienting the magnetic material while in a relatively mobile state, i. e. by suspending the material in a magnetic field and forming a body under pressure while the material is subjected to the magnetic field. This body is then sintered at a temperature of about 1100° to 1400° C. to form a coherent dense body, i. e. a body having a density more than 4. Such anisotropic magnets may have a $(BH)_{max}$ substantially greater than $1.1 \times 10^6$ gauss-oersted.

It is an object of our invention to make permanent anisotropic magnets of the aforesaid type having a $(BH)_{max}$ likewise exceeding $1.1 \times 10^6$ gauss-oersted.

It is a principal object of our invention to make permanent anisotropic magnets of the aforesaid type having a $(BH)_{max}$ exceeding $2.0 \times 10^6$ gauss-oersted.

It is a further object of our invention to simplify the manufacture of permanent anisotropic magnets of the aforesaid type.

It is a still further object of our invention to make permanent anisotropic magnets of the aforesaid type more economically.

These and further objects of our invention will appear as the specification progresses.

In the manufacture of permanent anisotropic magnets of the aforesaid type, three stages of preparation are required, namely, (1) Preparation of an isotropic material by mixing and sintering together about 6 moles of $Fe_2O_3$ and about one mole of one or more of the oxides of barium, strontium and lead. In this step, a material is formed which is ferromagnetic and has a composition $MO.6Fe_2O_3$, M being one of the latter metals.

(2) Magnetic orientation of the isotropic material while molding the same into a body.

(3) Final sintering of the molded body at relatively high temperatures to form a dense product.

While basically our invention involves the same steps, we have found quite unexpectedly that in step 2, we can add up to 80% by weight of the unreacted oxides leading to the product in step 1 and the sintered body produced in step 3 will have a $(BH)_{max}$ value still exceeding $1.1 \times 10^6$ gauss-oersted. Thus, only 20% by weight of the material in step 2 need be reacted oxides which effects a considerable simplification and economy in the procedure.

The unreacted oxides may be mixed with the isotropic material in a ratio other than their ratio in the reacted product.

If, to the material in step 2, before pressing, we add about 0.01 to 1% by weight of modifier, i. e. an oxide such as calcium oxide, barium oxide, lanthanum oxide, bismuth oxide, arsenic trioxide, antimony pentoxide; or a compound which decomposes upon heating to form those oxides such as calcium carbonate, barium carbonate or barium sulphate; or a compound of one of those oxides and ferric oxides such as barium ferrite and calcium ferrite, products having $(BH)_{max}$ values even higher, e. g. up to $3.0 \times 10^6$ may be obtained.

In the following examples we have described procedures for making permanent anisotropic magnets in accordance with our invention which are to be considered illustrative only, the invention being defined in the claims appended to this specification.

EXAMPLE I

A dry mixture of barium carbonate, $BaCO_3$, and iron oxide, $Fe_2O_3$, in the molecular ratio of 1:5.5 was ground in a vibration mill for three hours. This powder mixture is indicated in the following table by "A." Part thereof was presintered by heating to about 1280° C. for about 30 minutes, cooled, suspended in water, ground in a ball mill for 25 hours and then dried and sieved. The finely-comminuted presintered material thus obtained is indicated in the following table by "B."

The powders A and B were mixed in different ratios by grinding them together in a vibration mill for half an hour. A suspension of this material in water of about 60% by weight was prepared and placed between the poles of a strong electro-magnet. The water was drained off by compressing the suspension with the magnetic field applied to the suspension. The compressed body thus obtained was heated to a temperature of 1240° C. to 1250° C. for about 10 minutes. Table I shows the relationship between materials prepared by mixing powders A and B in different proportions and the characteristic properties of the permanent magnets obtained. By way of explanation it should be noted that the "orientation ratio"

$$\frac{B_r \|}{B_r \perp}$$

is a measure for the anisotropy of the magnets obtained. $B_r\|$ designates the remanence measured in a direction parallel to the external magnetic field applied during compression; $B_r \perp$ designates the remanence measured in a direction at right angles thereto.

Table I

| Comp. of the compr. body | | Rem. $B_r$ in Gauss | Coercivity $(B^Hc)$ in Oersted | $(BH)_{max}$ in Gauss-Oersted | Density | Or. ratio $\frac{B_r\|}{B_r\perp}$ |
|---|---|---|---|---|---|---|
| Percent by w. A | Percent by w. B | | | | | |
| --------- | 100 | 3,050 | 2,020 | $2.03\times10^6$ | 4.58 | 2.13 |
| 10 | 90 | 3,050 | 1,950 | $2.03\times10^6$ | 4.66 | 2.13 |
| 20 | 80 | 3,120 | 1,820 | $2.04\times10^6$ | 4.72 | 2.18 |
| 40 | 60 | 3,180 | 1,800 | $2.03\times10^6$ | 4.69 | 2.16 |
| 60 | 40 | 2,840 | 1,800 | $1.65\times10^6$ | 4.72 | 1.77 |
| 80 | 20 | 2,440 | 1,710 | $1.21\times10^6$ | 4.65 | 1.37 |
| 100 | --------- | 1,900 | 1,500 | $0.75\times10^6$ | 4.45 | 1.00 |

EXAMPLE II

A dry mixture of barium carbonate, $BaCO_3$, and iron oxide $Fe_2O_3$, in the molecular ratio of 1:5.5 was ground in a vibration mill for three hours. This powder mixture is indicated in the following table by "A." Part thereof was presintered by heating to about 1280° C. for about 10 minutes and then cooled. About 0.5% by weight of calcium carbonate, $CaCO_3$, was added to the presintered product which was ground in the presence of water for 24 hours and then dried and sieved. The finely-comminuted presintered product thus obtained is indicated in the following table by "B." In the same manner as described in Example I, permanent magnets were made from a number of mixtures of the powders A and B in different proportions. Table II shows the relationship between the proportions of the powders A and B and the characteristic properties of the magnets obtained.

Table II

| Comp. of the compr. body | | Rem. $B_r$ in Gauss | Coercivity $(B^Hc)$ in Oersted | $(BH)_{max}$ in Gauss-Oersted | Density | Or. ratio $\frac{B_r\|}{B_r\perp}$ |
|---|---|---|---|---|---|---|
| Percent by w. A | Percent by w. B | | | | | |
| --------- | 100 | 3,690 | 1,260 | $2.53\times10^6$ | 5.00 | 3.80 |
| 10 | 90 | 3,670 | 1,300 | $2.58\times10^6$ | 5.03 | 3.78 |
| 20 | 80 | 3,640 | 1,300 | $2.55\times10^6$ | 4.97 | 3.96 |
| 40 | 60 | 3,500 | 1,370 | $2.38\times10^6$ | 4.89 | 3.71 |
| 60 | 40 | 3,030 | 1,620 | $1.86\times10^6$ | 4.63 | 2.55 |
| 80 | 20 | 2,450 | 1,540 | $1.14\times10^6$ | 4.65 | 1.46 |
| 100 | --------- | 1,900 | 1,500 | $0.75\times10^6$ | 4.41 | 1.00 |

From the examples described above it is evident that:
(a) with a ratio of 40% by weight of A to 60% by weight of B a magnet was obtained which had a $(BH)_{max}$ value which is not appreciably lower than that of a magnet obtained from a completely presintered powder (100% by weight of B); (b) even in the presence of not more than 20% by weight of presintered powder in the compressed body a $(BH)_{max}$ value is obtained, which is materially higher than that of an isotropic magnet of the same material.

EXAMPLE III

A dry mixture of strontium carbonate, $SrCO_3$, and iron oxide, $Fe_2O_3$ in a molecular ratio of 1:5, was ground in a vibration mill for four hours. This powder mixture is indicated in the following Table III by "A." Part thereof was presintered by heating to about 1280° C. for about 30 minutes; it was then cooled, ground in the presence of water in a ball mill for 40 hours, dried and seived. The finely-comminuted presintered product thus obtained is indicated in the following Table III by "B."

The powders A and B were mixed in different ratios by grinding them together in a vibrant mill for one hour. Then a quantity of water of about 60% by weight of the powder mixture was added and from the suspension obtained the water was drained by compression, while the suspension was disposed between the poles of a strong electromagnet. The compressed body thus obtained was heated to a temperature of about 1275° C. for about 10 minutes. Table III indicates the relationship between the proportions of the powders and the characteristic properties of the permanent magnets obtained.

Table III

| Comp. of the compr. body | | Rem. $B_r$ in Gauss | Coercivity $(B^Hc)$ in Oersted | $(BH)_{max}$ in Gauss-Oersted | Density | Or. ratio $\frac{B_r\|}{B_r\perp}$ |
|---|---|---|---|---|---|---|
| Percent by w. A | Percent by w. B | | | | | |
| --------- | 100 | 3,300 | 1,560 | $2.34\times10^6$ | 4.85 | 2.3 |
| 40 | 60 | 3,620 | 1,600 | $2.46\times10^6$ | 4.66 | 3.6 |
| 80 | 20 | 3,160 | 1,860 | $2.21\times10^6$ | 4.66 | 2.8 |
| 100 | --------- | 2,160 | 1,600 | $0.96\times10^6$ | 4.83 | 1.0 |

EXAMPLE IV

A mixture of barnium carbonate, $BaCO_3$, and iron oxide, $Fe_2O_3$, in a molecular ratio of 1:6.1, was ground with alcohol in a ball mill for 18 hours and the alcohol evaporated. The powder mixture obtained is indicated in the following Table IV by "A." A mixture of barium carbonate, $BaCO_3$, and iron oxide, $Fe_2O_3$, in a molecular ratio of 1:5.6 was ground dry for 15 minutes. Then 5% of water was added and the grinding operation continued for 10 minutes. Then the mixture was compressed to form tablets having a diameter of about 7 cms. and a thickness of 2 to 4 cms. These tablets were heated to a temperature of about 1280° C. for about 15 minutes. Subsequent to cooling the tablets were hammered to fineness and ground dry for 15 minutes. Then the grinding operation was continued for 4 hours with alcohol as a grinding liquid in a vibration mill, after which the alcohol was evaporated. The finely comminuted presintered product thus obtained is indicated in the following Table IV by "B."

In the same manner as indicated in Example I, permanent magnets are made from a number of mixtures of the powders A and B with different ratios of mixing. The temperature at which the compressed bodies were heated, was 1270° C.

Table IV shows the relationship between the proportions of the powders A and B and the characteristic properties of the permanent magnets obtained.

Table IV

| Comp. of the compr. body | | Rem. $B_r$ in Gauss | Coercivity $(B^Hc)$ in Oersted | $(BH)_{max}$ in Gauss-Oersted | Density | Or. ratio $\frac{B_{r\parallel}}{B_{r\perp}}$ |
|---|---|---|---|---|---|---|
| Percent by w. A | Percent by w. B | | | | | |
| -------- | 100 | 3,760 | 1,800 | $2.86\times10^6$ | 4.95 | 3.5 |
| 20 | 80 | 3,660 | 1,580 | $2.84\times10^6$ | 4.77 | 3.8 |
| 40 | 60 | 3,380 | 1,950 | $2.65\times10^6$ | 4.64 | 3.2 |
| 60 | 40 | 3,150 | 2,300 | $2.20\times10^6$ | 4.37 | 2.9 |
| 80 | 20 | 2,680 | 1,800 | $1.50\times10^6$ | 3.94 | 2.2 |
| 100 | -------- | 1,530 | 1,300 | $0.52\times10^6$ | 3.50 | 1.0 |

What is claimed is:

1. A method of producing an anisotropic permanent magnet comprising the steps of mixing a finely comminuted permanent magnetic material having a composition $MO.6Fe_2O_3$, M being a metal selected from the group consisting of barium, strontium and lead, with up to four times the weight of said material of a mixture of an oxide of one of said metals and $Fe_2O_3$, said mixture containing about 1 mole of an oxide MO for each 6 moles of $Fe_2O_3$ magnetically orienting said permanent magnetic material in the mixture while the latter is in a mobile condition, and sintering said mixture at a temperature of about 1100 to 1400° C., to form a body having a density of at least 4 and constituted principally by hexagonal crystals having dimensions smaller than 10µ and having a composition corresponding to said formula $MO.6Fe_2O_3$.

2. A method of producing an anisotropic permanent magnet comprising the steps of mixing a finely permanent magnetic comminuted material having a composition $MO.6Fe_2O_3$, M being a metal selected from the group consisting of barium, strontium and lead, and about 0.6 to 1% by weight of a modifier selected from the group consisting of calcium oxide, barium oxide, lanthanum oxide, bismuth oxide, arsenic trioxide, antimony pentoxide, and compounds which form these oxides upon heat decomposition with up to four times the weight of said material of a mixture of an oxide of one of said metals and $Fe_2O_3$, said mixture containing about 1 mole of an oxide MO for each 6 moles of $Fe_2O_3$ magnetically orienting said permanent magnetic material in the mixture while the latter is in a mobile condition, and sintering said mixture at a temperature of about 1100 to 1400° C. to form a body having a density of at least 4 and constituted principally by hexagonal crystals having dimensions smaller than 10µ and having a composition corresponding to said formula $MO.6Fe_2O_3$.

3. A method of producing an anisotropic permanent magnet comprising the steps of mixing a finely comminuted permanent magnetic material having a composition $MO.6Fe_2O_3$, M being a metal selected from the group consisting of barium, strontium and lead, and about 0.1 to 1% by weight of calcium carbonate as a modifier with up to four times the weight of said material of a mixture of an oxide of one of said metals and $Fe_2O_3$ said mixture containing about 1 mole of an oxide MO for each 6 moles of $Fe_2O_3$, magnetically orienting said permanent magnetic material in the mixture while the latter is in a mobile condition, and sintering said mixture at a temperature of about 1000 to 1400° C. to form a body having a density of at least 4 and constituted principally by hexagonal crystals having dimensions smaller than 10µ and having a composition corresponding to said formula $MO.6Fe_2O_3$.

4. A method of producing an anisotropic permanent magnet comprising the steps of mixing about 6 moles of ferric oxide and about one mole of an oxide of at least one metal selected from the group consisting of barium, strontium and lead, presintering said mixture at about 1100 to 1400° C. to form a product consisting principally of a composition $MO.6Fe_2O_3$, M being one of said metals, comminuting said product mixing said product with up to four times the weight of said material of a mixture of an oxide of one of said metals and $Fe_2O_3$, said mixture containing about 1 mole of an oxide MO for each 6 moles of $Fe_2O_3$, magnetically orienting said permanent magnetic material in the mixture while the latter is in a mobile condition, and sintering said mixture at a temperature of about 1100 to 1400° C. to form a body having a density of at least 4 and constituted principally by hexagonal crystals having dimensions smaller than 10µ and having a composition corresponding to said formula $MO.6Fe_2O_3$.

5. A method of producing an anisotropic permanent magnet comprising the steps of mixing about 6 moles of $Fe_2O_3$ and 1 mole of $BaCO_3$, presintering said mixture at about 1100° to 1400° C. to form a product consisting principally of a composition $BaO.6Fe_2O_3$, comminuting said product, mixing said comminuted product with up to four times the weight of said material of a mixture of an oxide of at least one metal selected from the group consisting of barium, strontium, and lead, and $Fe_2O_3$, said mixture containing about 1 mole of an oxide MO for each 6 moles of $Fe_2O_3$, M being one of said metals, magnetically orienting said permanent magnetic material in the mixture while the latter is in a mobile condition, and sintering said mixture at a temperature of about 1100 to 1400° C. to form a body having a density of at least 4 and constituted principally by hexagonal crystals having dimensions smaller than 10µ and having a composition corresponding to said formula $MO.6Fe_2O_3$.

References Cited in the file of this patent

UNITED STATES PATENTS 2,700,023     Albers-Schonberg _____ Jan. 18, 1955

OTHER REFERENCES

Electrical Engineering, July 1952, article by Brockman, pages 644–647.

J. Applied Physics, page 1282, vol. 23, 1952.

UNITED STATES PATENT OFFICE
CERTIFICATE OF CORRECTION

Patent No. 2,837,483                          June 3, 1958

Petrus Johannes Hakker et al.

It is hereby certified that error appears in the printed specification of the above numbered patent requiring correction and that the said Letters Patent should read as corrected below.

Column 4, line 26, for "vibrant" read -- vibration --; line 67, for "barnium" read -- barium --; column 6, line 8, for "1000 to 1400° C." read -- 1100 to 1400° C. --.

Signed and sealed this 26th day of August 1958.

(SEAL)

Attest:

KARL H. AXLINE

Attesting Officer

ROBERT C. WATSON
Commissioner of Patents